US012694712B2

(12) United States Patent
    Kubota

(10) Patent No.: US 12,694,712 B2
(45) Date of Patent: Jul. 28, 2026

(54) INFORMATION PROCESSING DEVICE AND INFORMATION PROCESSING METHOD

(71) Applicant: Panasonic Intellectual Property Management Co., Ltd., Osaka (JP)

(72) Inventor: Masao Kubota, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 327 days.

(21) Appl. No.: 18/286,723

(22) PCT Filed: Feb. 22, 2022

(86) PCT No.: PCT/JP2022/007315
§ 371 (c)(1),
(2) Date: Oct. 12, 2023

(87) PCT Pub. No.: WO2022/219933
PCT Pub. Date: Oct. 20, 2022

(65) Prior Publication Data
US 2024/0193988 A1      Jun. 13, 2024

(30) Foreign Application Priority Data

Apr. 16, 2021   (JP) ................................. 2021-069724

(51) Int. Cl.
*G06V 40/16*        (2022.01)
*G06T 1/00*         (2006.01)
            (Continued)

(52) U.S. Cl.
CPC .............. *G06V 40/172* (2022.01); *G06T 7/20* (2013.01); *G06V 20/52* (2022.01); *G06V 40/168* (2022.01);
            (Continued)

(58) Field of Classification Search
CPC .... G06V 40/172; G06V 20/52; G06V 40/168; G06T 7/20; G06T 2207/30201;
            (Continued)

(56) References Cited

U.S. PATENT DOCUMENTS

2005/0212654 A1*   9/2005   Yoda ........................ G07C 9/38
                                                                340/5.2
2010/0067749 A1*   3/2010   Kusama ............... H04N 23/611
                                                                382/118
            (Continued)

FOREIGN PATENT DOCUMENTS

JP      H09-330440        12/1997
JP      2015-001790       1/2015
            (Continued)

OTHER PUBLICATIONS

International Search Report issued in International Bureau of WIPO Patent Application No. PCT/JP2022/007315, dated May 17, 2022, along with an English translation thereof.

*Primary Examiner* — Chineyere Wills-Burns
*Assistant Examiner* — Lucius Cameron Gree Allen
(74) *Attorney, Agent, or Firm* — GREENBLUM & BERNSTEIN, P.L.C.

(57)            ABSTRACT

An information processing device comprises: an acquisition unit that acquires an image which includes a facial image region and in which an image of a person who goes into a gate is captured from the direction from the exit to the entrance; a processing unit that performs a second facial authentication process for a person for whom a first facial authentication process has been successful, the first facial authentication process being based on a first image captured in a first area, and the second facial authentication process being based on a second image captured in a second area between the exit of the gate and the first area; and an output unit that, when the person for whom the first facial authen- (Continued)

tication process has been successful and a person in the second image are determined to be identical, outputs that the person has passed through the gate.

8 Claims, 7 Drawing Sheets

(51) Int. Cl.

| | |
|---|---|
| *G06T 7/20* | (2017.01) |
| *G06V 20/52* | (2022.01) |
| *G07B 15/00* | (2011.01) |
| *G07C 9/00* | (2020.01) |
| *G07C 9/10* | (2020.01) |
| *G07C 9/37* | (2020.01) |

(52) U.S. Cl.
CPC ...... *G07C 9/10* (2020.01); *G06T 2207/30201* (2013.01); *G06T 2207/30232* (2013.01)

(58) Field of Classification Search
CPC ... G06T 2207/30232; G06T 1/00; G07C 9/10; G07C 9/00; G07C 9/37; G07B 15/00

USPC ......................................................... 382/118
See application file for complete search history.

(56)                    References Cited

U.S. PATENT DOCUMENTS

| | | | | |
|---|---|---|---|---|
| 2017/0070501 | A1* | 3/2017 | Saito | G06V 40/161 |
| 2019/0066471 | A1* | 2/2019 | Jeon | G08B 13/19613 |
| 2019/0180017 | A1* | 6/2019 | Takashima | G06V 40/172 |
| 2020/0097762 | A1* | 3/2020 | Savchenko | G06F 18/2163 |
| 2020/0105080 | A1* | 4/2020 | Maeno | H04L 67/10 |
| 2020/0285841 | A1* | 9/2020 | Goulden | G08B 13/19684 |
| 2020/0357209 | A1* | 11/2020 | Kochi | G07C 9/00563 |
| 2022/0172543 | A1* | 6/2022 | Kochi | G07C 9/37 |
| 2022/0237970 | A1 | 7/2022 | Hirasawa et al. | |
| 2022/0358804 | A1* | 11/2022 | Inoue | G07C 9/15 |
| 2023/0267788 | A1* | 8/2023 | Yokoyama | G07C 9/10 |
| | | | | 382/115 |

FOREIGN PATENT DOCUMENTS

| | | |
|---|---|---|
| JP | 2020-057191 | 4/2020 |
| JP | 2020-205001 A | 12/2020 |

* cited by examiner

INFORMATION PROCESSING DEVICE AND INFORMATION PROCESSING METHOD

TECHNICAL FIELD

The present disclosure relates to an information processing apparatus and an information processing method.

BACKGROUND ART

Techniques for managing entry and exit of a person passing through a gate installed in a station, an airport, or the like are known. Patent Literature (hereinafter, referred to as "PTL") 1 describes an apparatus that, when a person enters a gate from an entrance of the gate while gaining permission for gate passage using a contactless card, tracks whether or not the person has passed through the gate (whether or not the person returns to the entrance of the gate) based on a change in position of the contactless card.

CITATION LIST

Patent Literature

PTL 1

Japanese Patent Application Laid-Open No. H09-330440

SUMMARY OF INVENTION

A gate that manages entry and exit is desired to manage which person has passed through the gate. Hereinafter, this management may also be simply referred to as "passage management" or "tracking management." There is scope for further study on a method of realizing the passage management with a simple configuration.

One non-limiting and exemplary embodiment of the present disclosure facilitates providing an information processing apparatus and an information processing method that realize, with a simple configuration, passage management of an object (for example, a person) passing through a gate.

An information processing apparatus according to one exemplary embodiment of the present disclosure includes: an acquirer that acquires an image of a person entering a gate, the image being captured in a direction from an exit of the gate toward an entrance of the gate and including a face image region: a processor that performs a second face authentication process on the person who has been successful in a first face authentication process, the first face authentication process being based on a first face image region in a first image captured in a first area defined for the gate, the second face authentication process being based on a second face image region in a second image captured in a second area defined between the first area and the exit of the gate; and an output processor that produces an output to an effect that the person has passed through the gate, when it is determined by the second face authentication process that the person who has been successful in the first face authentication process and the person included in the second image are an identical person.

An information processing method according to one exemplary embodiment of the present disclosure includes steps performed by an information processing apparatus of: acquiring a captured image of a person who enters through an entrance of a gate: executing a first face authentication process based on image information on a first region of a face of the person in a first image, when the person enters the first area: executing a second face authentication process based on image information on a second region of the face of the person in a second image acquired after the first image, when the person is permitted in the first face authentication process to pass through the gate and when the person enters a second area between the first area and an exit of the gate: and producing an output to an effect that the person has passed through the gate, when it is determined by the second face authentication process that the person who has been successful in the first face authentication process and the person included in the second image are an identical person.

It should be noted that a general or specific embodiment may be implemented as a system, an apparatus, a method, an integrated circuit, a computer program, a storage medium, or any selective combination thereof.

One non-limiting and exemplary embodiment of the present disclosure can realize, with a simple configuration, passage management of an object (e.g., a person) passing through a gate.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
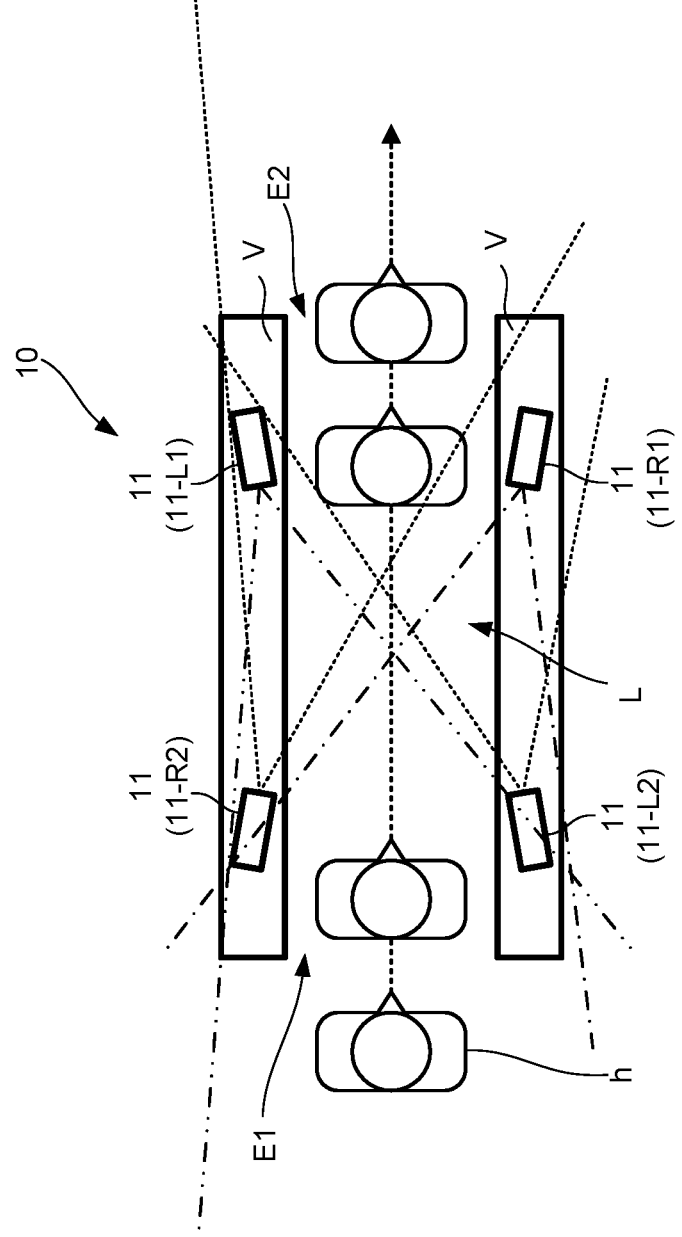
FIG. 1 is a diagram illustrating an example of a gate according to an embodiment.

Hereinafter, preferred embodiments of the present disclosure will be described in detail with reference to the appended drawings. Note that, in the present specification and drawings, components having substantially the same functions are provided with the same reference symbols, and redundant description will be omitted.

One Embodiment

Knowledge Leading to Present Disclosure

As for a gate that is installed in a facility such as a station or an airport and at which the entry to or exit from the facility is managed, utilizing passage management for accurately managing which person has passed through the gate and whether the person has correctly passed through the gate has been examined. If the passage management is not sufficient, for example, gate passage of a person may be erroneously determined who entered through the entrance of the gate and returned to the entrance of the gate without moving toward the exit, or it may be erroneously recognized that a person who has actually passed has not passed the gate. Such errors can lead to mischarge, for example, in services such as that in which a person who has passed through a gate, such as a station ticket gate, is charged.

In order to perform the passage management, for example, an authentication process of authenticating a person intending passage (which process may, for example, include a process of determining that the authenticating process of a person cannot be performed) and a tracking process of recording a history of movement of the person are performed. These processes are preferably performed at an early stage in order to secure time for performing processes such as recording the passage of a person or the opening and closing process of a door of the gate, for example, which restricts the movement of the person.

For example, it is considered that a camera is installed above the person and the gate (for example, on a ceiling portion), the camera on the ceiling portion captures the image of the person and the gate, and the captured image is analyzed for a tracking process for tracking the image-captured person.

However, when the camera is installed on the ceiling portion, the installation location of the camera may be limited depending on the structure or environment of the installation location. In addition, even when the installation is possible, the installation cost increases in a case where a large-scale construction is required for the installation. Therefore, it may be difficult to introduce a passage management system using a camera installed on a ceiling portion.

For example, it is conceivable to provide a gate with an arcuate or pole-shaped support portion extending above the gate, and install a camera on the support portion. However, the gate having such a support portion may have a larger size in the height direction than a gate having no support portion. Accordingly, the installation location of the gate may be limited. In addition, it may be undesirable to provide the gate with a support portion in a design aspect.

In the present embodiment, a passage management process including an authentication process and a tracking process is performed by performing the tracking process for tracking a person who is going to pass through a gate by using an image captured by a camera used in a face authentication process of the person who is going to pass through the gate. Since the camera used in the authentication process is used also in the tracking process, it is not necessary to separately install an apparatus (for example, a camera on a ceiling portion or the like) for the tracking process. Therefore, it is possible to suppress an increase in the introduction cost of the passage management. In addition, as compared with the case where equipment such as a dedicated camera is installed for the tracking process, a restriction on the installation location is relaxed. Thus, the degree of freedom in the installation location increases, and the introduction of the passage management system is facilitated.

<Exemplary Configuration of Gate>

FIG. 1 is a diagram illustrating an example of gate 10 according to the present embodiment. FIG. 1 is a view of gate 10 viewed from above, and illustrates a state in which person h enters through entrance/exit E1 of gate 10 and exits through entrance/exit E2 of gate 10. Note that, with respect to gate 10 illustrated in FIG. 1, a person may enter through entrance/exit E2 and exit through entrance/exit E1. In other words, gate 10 allows a person to pass in opposite directions.

Gate 10 includes, for example, side walls V facing each other, and path L for guiding a person passing through gate 10 is formed between side walls V. Each of side walls V having a height of 1 m or the like is, for example, at an upper portion, provided with cameras 11 at two positions closer to entrance/exits E1 and E2, respectively, than to the central portion of side wall V. A total of four cameras 11 (11-R1, 11-R2, 11-L1, 11-L2) are disposed for two side walls V.

Cameras 11-R1 and 11-L1 are installed, for example, respectively on side walls V at positions closer to entrance/exit E2 than to the central portion of gate 10, and are used for capturing an image of a person who enters through entrance/exit E1 of gate 10 and passes toward entrance/exit E2.

On the other hand, cameras 11-R2 and 11-L2 are installed, for example, respectively on side walls V at positions closer to entrance/exit E1 than to the central portion of gate 10, and are used for capturing an image of a person who enters through entrance/exit E2 of gate 10 and passes toward entrance/exit E1.

For example, camera 11-R1 is installed at a position where an image of a person can be captured from the right front of the person entering through entrance/exit E1. Camera 11-L1 is installed, for example, at a position where an image of a person can be captured from the left front of the person entering through entrance/exit E1.

For example, camera 11-R2 is installed at a position where an image of a person can be captured from the right front of the person entering through entrance/exit E2 opposite to entrance/exit E1. For example, camera 11-L2 is installed at a position where an image of a person can be captured from the left front of the person entering through entrance/exit E2 opposite to entrance/exit E1.

Therefore, an image of a person who enters gate 10 through entrance/exit E1 and passes toward entrance/exit E2 is captured from two directions (for example, the left and right directions) by, for example, two cameras 11-R1 and 11-L1 installed on the upper portions of two side walls V at positions apart from each other with path L being interposed therebetween.

On the other hand, an image of a person who passes through gate 10 in the reverse direction, that is, a person who enters gate 10 through entrance/exit E2 and passes through entrance/exit E1 is captured from two directions (for example, the left and right directions) by, for example, two cameras 11-R2 and 11-L2 installed on the upper portions of two side walls V at positions apart from each other with path L being interposed therebetween.

Note that FIG. 1 illustrates a configuration in which a person can enter through both entrance/exit E1 and entrance/exit E2 of gate 10, but the present disclosure is not limited to this. For example, gate 10 may be configured such that a person can enter through one entrance/exit (e.g., entrance/exit E1) and cannot enter through the other entrance (e.g., entrance/exit E2). In a configuration in which gate 10 does not allow entry of a person through entrance/exit E2, camera 11-R2 and camera 11-L2 may not be installed. In a configuration in which gate 10 does not allow entry of a person through entrance/exit E1, camera 11-R1 and camera 11-L1 may not be installed.

Further, although FIG. 1 illustrates the example in which images of the person entering through the entrance/exit of gate 10 are captured in two directions by two cameras 11, the present disclosure is not limited to this. For example, an image of a person entering through the entrance/exit of gate 10 may be captured in one direction (a direction from the exit of gate 10 toward the entrance) by one camera 11. Alternatively, in a case where images of a person entering through the entrance/exit of gate 10 are captured in two directions by two cameras 11, one of the images captured by two cameras 11 may be selected, and the authentication process and the tracking process may be executed based on the selected image.

In the following, an example will be described in which, at gate 10 illustrated in FIG. 1, the passage management of a person entering through entrance/exit E1 and passing toward entrance/exit E2 is performed using an image captured by camera 11-R1 or camera 11-L1. Camera 11-R1 and camera 11-L1 may be collectively referred to as cameras 11 for convenience.

The person entering gate 10 corresponds to a person as a target of a process including the face authentication process. Hereinafter, the person as a target of the process is referred to as a "target person."

Note that gate 10 of FIG. 1 is an example, and the present disclosure is not limited to this. For example, five or more cameras 11 may be installed on gate 10, or three or less cameras 11 may be installed. By changing the image-capturing directions and/or the angles of cameras 11, it is possible to capture an image of a face of a person in a wider range.

Note that the plurality of cameras 11 may not be identical to one another. For example, the plurality of cameras 11 may be configured to capture images of different resolutions, angle of view, and image quality. In addition, the installation positions and/or the image-capturing directions of cameras 11 may be fixed or adjustable.

<System Configuration>

Figure 2A:
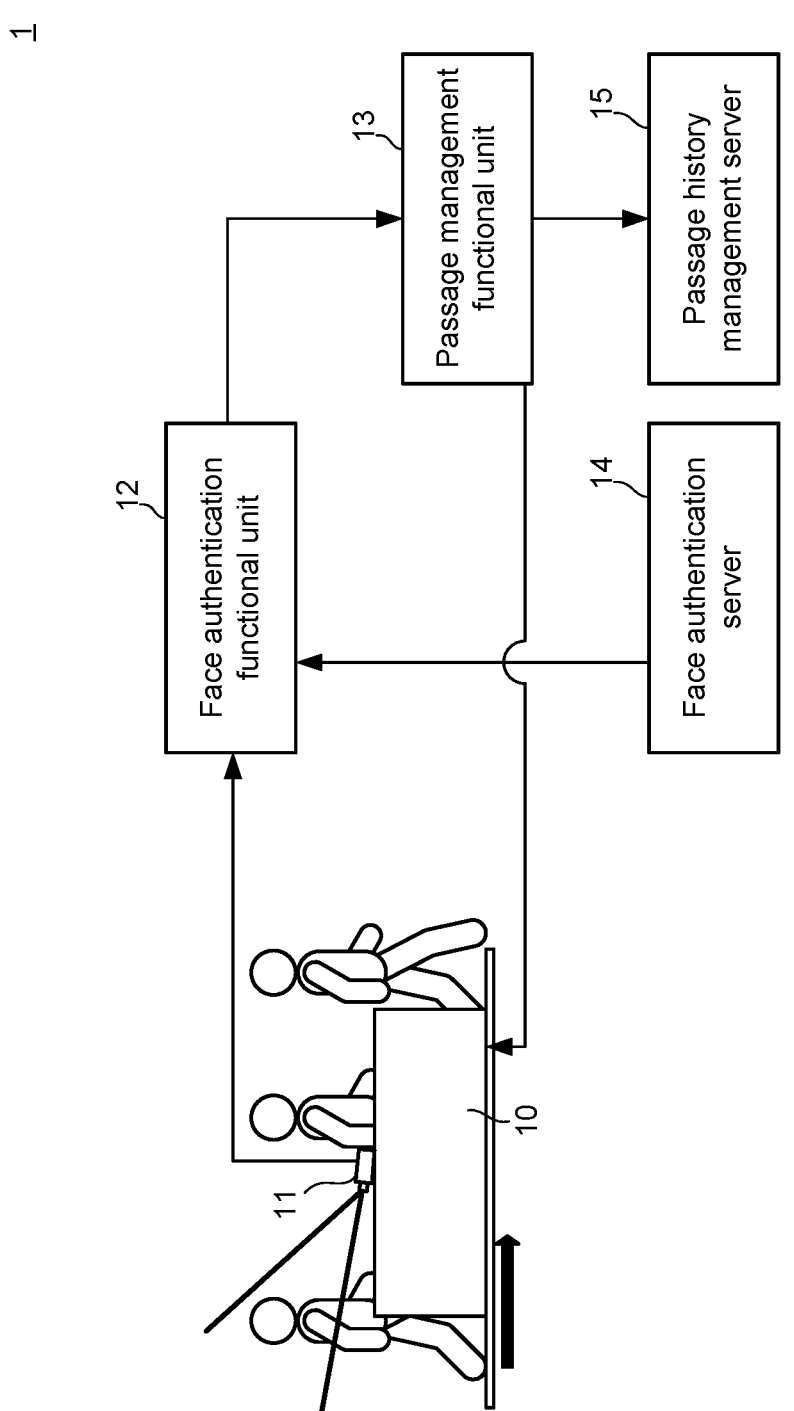
FIG. 2A is a diagram illustrating a conceptual configuration of a passage management system according to an embodiment.
Figure 2B:
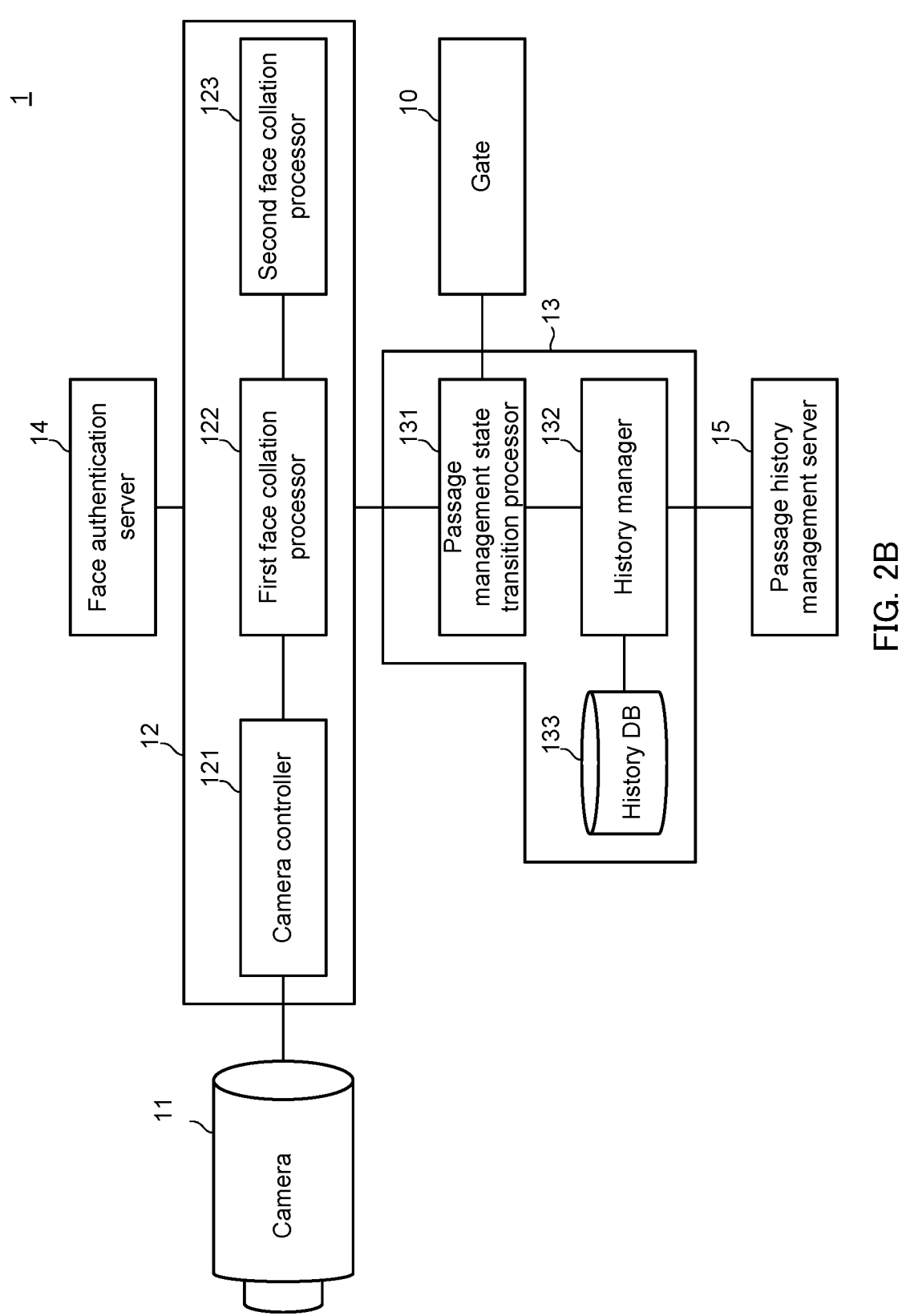
FIG. 2B is a block diagram illustrating a configuration example of the passage management system according to an embodiment.

FIG. 2A is a diagram illustrating a configuration of a passage management system according to the present embodiment. FIG. 2B is a block diagram illustrating an exemplary configuration of the passage management system according to the present embodiment. Passage management system 1 according to the present embodiment is a system that manages the passage of a person at gate 10 (for example, an entry gate, a ticket gate, or the like) installed at an entrance/exit of a facility such as an airport, a station, or an event hall.

In passage management system 1 according to the present embodiment, for example, management of entry and leaving of a user who uses the facility is executed by face authentication. For example, when the user enters the facility through gate 10, it is determined by face authentication whether or not the user is a person permitted to enter the facility. Further, when the user passes through the gate and leaves the facility, it is determined by face authentication which user leaves the facility. Note that "face authentication" may be regarded as a concept included in "collation using a face image."

Passage management system 1 includes, for example, gate 10 illustrated in FIG. 1, cameras 11 (right cameras 11 or left cameras 11), face authentication functional unit 12, passage management functional unit 13, face authentication server 14, and passage history management server 15. Passage management system 1 may include one gate 10 or a plurality of gates 10.

Gate 10 is installed in a facility such as an airport, a station, or an event hall, for example. A user authorized to use the facility passes through gate 10 when entering and/or leaving the facility. In addition, gate 10 performs a control to prevent passage of a person who is not permitted to enter the facility.

As illustrated in FIG. 1, cameras 11 are installed, for example, on side walls V of gate 10. Cameras 11 capture an image of an image-capturing range including a person passing through gate 10 and a face of a person who is going to pass through gate 10 of when such a person is present. For example, the image-capturing range of cameras 11 is a range in which an image of a face of a front of a person can be captured.

Face authentication functional unit 12 performs the face authentication process on the image. In the present embodiment, by way of example, face authentication functional unit 12 performs at least two stages of face authentication process.

For example, face authentication functional unit 12 includes camera controller 121, first face collation processor 122, and second face collation processor 123. First face collation processor 122 performs a face authentication process in the first stage, and second face collation processor 123 performs face authentication processes in the second and subsequent stages.

Camera controller 121 controls, for example, an image-capturing timing of cameras 11. For example, cameras 11 capture an image at a rate of about 5 frames per second (fps) under the control of camera controller 121. Further, right camera 11 and left camera 11 may perform image capturing at the same time or with a difference in image-capturing timing within an allowable range under the control of camera controller 121, for example. The image-capturing timings may be synchronized with each other. Alternatively, right camera 11 and left camera 11 may perform image capturing asynchronously at respective independent image-capturing timings under the control of camera controller 121, for example.

For example, camera controller 121 detects a face frame from images (a right image and/or a left image) captured by cameras 11. A method of detecting the face frame is not particularly limited, but may be, for example, a method of detecting a frame (face frame) surrounding a face region by detecting parts (eyes, nose, and mouth) included in the face from the images and detecting a boundary between the face region and a region outside the face based on the detected positions and color information of the parts. For example, when the face frame is detected, camera controller 121 outputs information on the detected face frame (face frame information) and the captured images to first face collation processor 122 and/or second face collation processor 123. For example, camera controller 121 determines, as an output destination, one of first face collation processor 122 and second face collation processor 123 according to the positional relation between gate 10 and the person. Below, the description, "face frame," may refer to a frame surrounding a region of a face, or may refer to the region of the face surrounded by the frame.

For example, first face collation processor 122 cuts out the face region included in the images based on the face frame information, and indicates, to face authentication server 14, a face authentication request including the information on the cut-out face region. The information on the face region may be, for example, an image of the face region or information indicating feature points extracted from the image of the face region.

For example, face images of persons permitted to pass through gate 10 are registered in face authentication server 14. The face images registered in face authentication server 14 may be described as registered face images. The registered face images may be associated with, for example, Identifications (IDs) of registered persons, which can uniquely identify or specify the persons. The registered face images may be, for example, information indicating feature points extracted from the images.

For example, when receiving the face authentication request from first face collation processor 122, face authentication server 14 determines (performs collation) whether or not the registered face images include a face of an identical person the same as the face in the face region included in the face authentication request. For example, face authentication server 14 indicates, to first face collation processor 122, a face collation result including a determination result. The face collation result may include, for example, information (for example, a flag indicating "OK" or "NG") indicating whether or not the face of the identical person the same as the face in the face region is included in the registered face images, and information (for example, an ID) of the person associated with a registered face image when the face of the identical person the same as the face in the face region is included in the registered face images.

The collation is, for example, to collate the registered face images with the face image of the person passing through gate 10, so as to determine whether or not any one of the registered face images registered in advance matches the face image of the person passing through gate 10, or whether or not any one of the registered face images registered in advance and the face image of the person passing through gate 10 are the face images of an identical person.

On the other hand, the authentication is, for example, to prove to the outside (for example, gate 10) that the person of the face image matching one of the face images registered in advance is the person of the registered face image (in other words, the person who is to be permitted to pass through gate 10).

However, in the present disclosure, the terms "collation" and "authentication" may be used interchangeably.

For example, the collation process is a process of comparing the feature points of the registered face images registered in advance with the feature points extracted from the detected face region and specifying whose face the face in the image data is. For example, a technique using machine learning may be used for the collation process. Further, the collation process may be performed in face authentication server 14, for example, but may be performed in another apparatus such as gate 10, or may be performed distributedly by a plurality of apparatuses.

First face collation processor 122 outputs, for example, information including a collation process result to second face collation processor 123 and passage management functional unit 13. The collation process result may include, for example, information on the registered face image and a collation score indicating a matching degree of the face image obtained by the collation process. In addition, the information outputted by first face collation processor 122 may include, for example, face frame detection information, an image-capturing time of a face image capturing camera image in which the face frame is detected, and information on the face region cut out by first face collation processor 122.

Note that the output destination for first face collation processor 122 is not limited to second face collation processor 123 and passage management functional unit 13. For example, first face collation processor 122 outputs the information including the collation process result to a display apparatus that presents image information to a person who is going to pass through gate 10 and/or an audio output apparatus that presents audio information to the person.

For example, second face collation processor 123 cuts out a face region included in the image based on the face frame information, and performs face collation using the information on the cut-out face region.

For example, second face collation processor 123 may collate the information on the face region cut out in second face collation processor 123 with the information on the face region cut out in first face collation processor 122, and determine whether or not the person corresponding to the face region cut out in second face collation processor 123 is the same as the person corresponding to the face region cut out in first face collation processor 122.

Alternatively, second face collation processor 123 may collate the information on the face region cut out in second face collation processor 123 with information on a registered face image included in the collation process result, and determine whether or not the person corresponding to the face region cut out in second face collation processor 123 is the same as the person corresponding to the registered face image included in the collation process result.

Second face collation processor 123 outputs, to passage management functional unit 13, information including a determination result of whether or not the persons corresponding to the two face regions are the same. Note that the output destination for second face collation processor 123 is not limited to passage management functional unit 13. For example, second face collation processor 123 outputs the information including the collation process result to the display apparatus that presents image information to a person who is going to pass through gate 10 and/or the audio output apparatus that presents audio information to the person.

Passage management functional unit 13 manages passage of a person located in the periphery of gate 10, for example, based on information output from face authentication functional unit 12. Examples of the person located in the periphery of gate 10 includes a person passing through gate 10, a person intending to pass through gate 10, and a person passing the periphery of gate 10. Here, the person intending to pass through gate 10 is not limited to a person who is permitted to pass through gate 10 (for example, a person whose face image has been already registered in face authentication server 14), and may be, for example, a person who attempts to pass through the gate although the face image has not been registered in face authentication server 14. Further, the person passing the periphery of gate 10 is, for example, a person who does not intend to pass through gate 10 but passes through the image-capturing range of camera 11 or a person who does not intend to pass through gate 10 but enters the image-capturing range. Further, the state of the person may be, for example, a state related to the movement of the person, such as whether the person is moving or stationary, and a moving direction when the person is moving.

Passage management functional unit 13 includes, for example, passage management state transition processor 131, history manager 132, and history database (DB) 133.

For example, in a passage management process for a person, passage management state transition processor 131 transmits control information related to control of gate 10 when a person permitted to pass through gate 10 passes through gate 10. In addition, passage management state transition processor 131 transmits, for example, the control information related to control of gate 10 in a case where a person who is not permitted to pass through gate 10 is going to pass through gate 10.

For example, history manager 132 stores and manages information (passage history information) indicating a history of a person who has passed through gate 10. Further, for example, history manager 132 stores the passage history information in history DB 133, and transmits the passage history information to passage history management server 15. For example, in a railway network, history manager 132 may manage local passage history information per 1 station (or 1 ticket gate).

Passage history management server 15 stores and manages, for example, information (passage history information) indicating a history of a person who has passed through gate 10. For example, passage history management server 15 may manage the passage history information on a plurality of gates 10. For example, in a large facility in which a plurality of entrance/exits, the passage history information on gate 10 installed at each of the plurality of entrance/exits may be aggregated and managed by passage history management server 15. Further, for example, in the railway network, the passage history information on each of gates 10 installed at the ticket gates of the plurality of stations may be aggregated and managed by passage history management server 15.

Note that, for example, passage management functional unit 13 may output information related to the passage management (passage management information) to a display apparatus (not illustrated). The passage management information may include, for example, information outputted by face authentication functional unit 12. The display apparatus may display, for example, the state of a person (for example, a result of face authentication of the person and the moving direction). For example, the display apparatus may display an image and superimpose the detected face frame on the image. In addition, the display apparatus may display, for example, information (for example, the ID of the person) related to the person obtained by face authentication by superimposing the information on the image.

Face authentication functional unit 12 described above may operate synchronously or asynchronously with passage management functional unit 13, for example. In the case of asynchronous operation, for example, face authentication functional unit 12 may operate when a face frame is detected by camera controller 121.

The functions of face authentication functional unit 12 and the functions of passage management functional unit 13 described above may be at least partially replaced between them. For example, a part of the functions of passage management functional unit 13 may be included in face authentication functional unit 12. For example, face authentication functional unit 12 may include an output processor that produces an output to an effect that the person as a determination target has passed through gate 10, when it is determined that the persons corresponding to the two face regions are the same. The information outputted by the output processor may include control information related to a control of gate 10 performed when the person permitted to pass through gate 10 passes the gate (for example, control information related to a control of gate 10 performed when the person not permitted to pass through gate 10 is going to pass through the gate).

The configurations of face authentication functional unit 12 and passage management functional unit 13 described above may each have a form of one information processing apparatus (for example, a server apparatus), or both of them may be included in one information processing apparatus. For example, face authentication functional unit 12 may have a form of one information processing apparatus, and passage management functional unit 13 may be included in the one information processing apparatus. Face authentication functional unit 12 and/or passage management functional unit 13 in the form of information processing apparatus may be included in gate 10.

The above-described information processing apparatus may include a processor, a memory, and an input/output interface used to transmit various types of information. The processor is an arithmetic apparatus such as a Central Processing Unit (CPU) or a Graphics Processing Unit (GPU). The memory is a memory apparatus implemented using a Random Access Memory (RAM), a Read Only Memory (ROM), and the like. The processor, the memory, and the input/output interface are connected to a bus, and exchange various kinds of information via the bus. The processor realizes functions of the configurations included in the information processing apparatus by, for example, loading a program, data, or the like stored in the ROM onto the RAM and executing processes.

In face authentication functional unit 12 described above, for example, the timing of the face authentication process may be determined according to where in zones defined for the periphery of gate 10 the person is located. One example of the zones defined for gate 10 is described below.

<Gate Region Management>

Figure 3A:
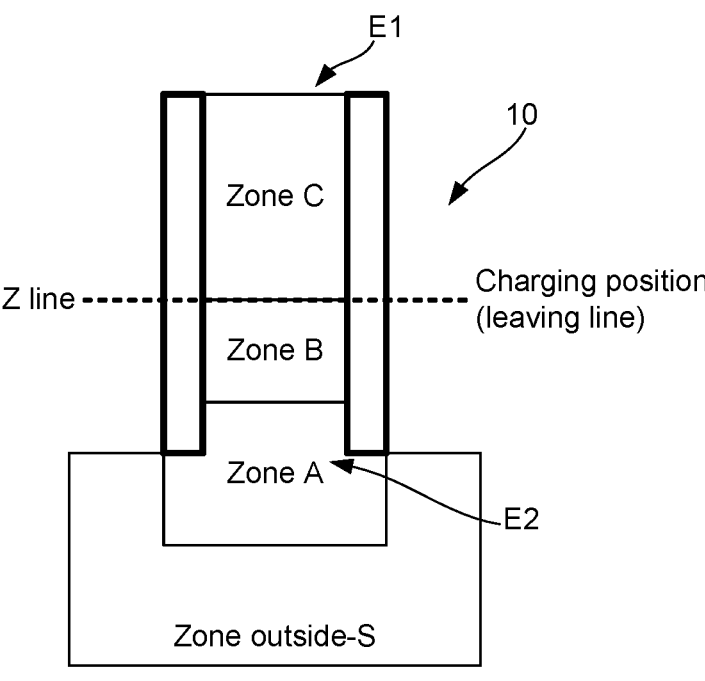
FIG. 3A is a diagram illustrating an example of zones defined for the gate.
Figure 3B:
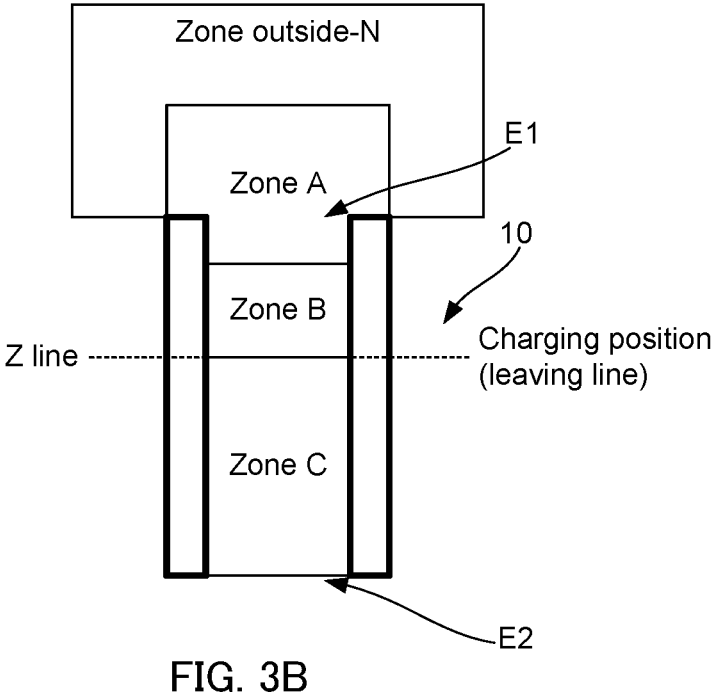
FIG. 3B is a diagram illustrating an example of zones defined for the gate.

FIGS. 3A and 3B illustrate exemplary zones defined for gate 10. FIGS. 3A and 3B illustrate an example of a plurality of zones for gate 10 as seen from above in a bird's-eye view. In FIGS. 3A and 3B, side walls V of gate 10 forming path L extend along the upper-lower direction in the plane of the figure.

As illustrated in FIG. 1, one of entrance/exits E1 and E2 of gate 10 on the an upstream side, for example, along a particular entry direction (for example, an entering direction) corresponds to an entrance, and one of the entrance/exits on a downstream side corresponds to an exit.

FIG. 3A illustrates exemplary zones for gate 10 where the person can enter through both entrance/exits E1 and E2, which zones are defined for a case where a person enters through entrance/exit E2. In addition, FIG. 3B illustrates exemplary zones defined for a case where a person enters through entrance/exit E1.

In a case where gate 10 is bidirectionally enterable, it is conceivable that whether the moving direction is a normal direction or not is different depending on the entrance/exit to enter. For example, the moving direction of the person from entrance/exit E1 toward entrance/exit E2 is the normal moving direction for a person who has entered through entrance/exit E1, while not for a person who has entered through entrance/exit E2. With respect to such a difference in definitions, entrance/exit E1 is defined as "North side," and entrance/exit E2 is defined as "South side" in the passage management function, for example.

Note that the expressions of the north side and the south side are merely examples, and the present disclosure is not limited to these expressions. For example, the expressions, "north side" and "south side," do not limit the placement of gate 10 to placement along the geographical north-south direction. For example, in a case where path L of gate 10 is located along a direction different from the north-south direction, or in a case where a curve is included in the path, one side may be defined as the "north side" and the other side may be defined as the "south side."

For example, FIG. 3A illustrates the exemplary zones defined for a case where a person enters through entrance/ exit E2. In FIG. 3A, "Zone outside-S" (southern outer-zone area), "Zone A," "Zone B," and "Zone C" are defined for gate 10.

In contrast, FIG. 3B illustrates the exemplary zones defined for a case where a person enters through entrance/ exit E1. In FIG. 3B, "Zone outside-N" (northern outer-zone area), "Zone A," "Zone B," and "Zone C" are defined for gate 10.

In the following, the zones will be described with reference to the example of FIG. 3A. Note that FIG. 3B is similar to FIG. 3A except that the person enters through entrance/ exit E1 and that the "Zone outside-S" (southern outer-zone area) is replaced with "Zone outside-N" (northern outer-zone area).

The boundary between the southern outer-zone area and zone A may be referred to as a "face authentication start line," for example.

The "face authentication start line" is used, for example, to determine whether or not to start the face authentication process (face collation process) in first face collation processor 122. For example, when a person enters gate 10 beyond the "face authentication start line," the face authentication process is started. For example, first face collation processor 122 issues a face authentication request from face frame information, links a collation result (face authentication ID) with person detection information, and starts tracking the person. Note that the "face authentication start line" may be referred to as an "A LINE."

The "face authentication start line" may be disposed outside gate 10 (e.g., on the upstream side along the path of gate 10). The "face authentication start line" is not limited to one line segment, and may include a plurality of line segments, for example, like a squarish U-shape. Note that the shape having a plurality of line segments is not limited to such a shape as the U-shape corresponding to a part of sides of a rectangular shape, and may be a shape corresponding to a part of sides of another polygonal shape. Alternatively, the "face authentication start line" may have an arc, or may have a shape in which a straight line and a curved line are mixed. For example, when the "face authentication start line" has a plurality of line segments and/or arcs, the face authentication process can be started when a person enters not only from the front but also in a direction deviated from the front, such as from the lateral side of gate 10.

The boundary between zone A and zone B may be referred to as a "door closure limit line," for example.

The "door closure limit line" indicates, for example, such a position that the exit-side gate door can be closed in time in response to a closing instruction before the person passes the position of the exit-side gate door. The "door closure limit line" is determined by considering, for example, a maximum speed assumed as a speed at which a person passes through gate 10 (e.g., 6 km/h: hereinafter referred to as "maximum passable speed") and a time required to physically close the gate door (e.g., 0.5 seconds). For example, the "door closure limit line" is set in front of the position of the physical gate door ("gate door position") by a distance corresponding to "maximum passage speed"× "time required for physically closing the gate door." By setting the "door closure limit line" as described above, when a person who is not permitted to pass through gate 10 passes the "door closure limit line" and moves at the maximum passable speed, the exit-side gate door can be closed before the person passes through the exit-side gate door.

Note that the "door closure limit line" may be referred to as "unauthorized intrusion detection line" or "B LINE."

The boundary between zone B and zone C may be referred to as a "leaving line."

The "leaving line" indicates, for example, a position at which the person is determined to have left gate 10. The "leaving line" may be disposed outside gate 10, for example, in the same manner as the "face authentication start line" described above. Further, the "leaving line" is not limited to one line segment, for example, and may have a plurality of line segments, like a squarish U-shape. Alternatively, the "leaving line" may have an arc. Note that the "leaving line" may be referred to as "Z LINE," for example.

In the passage management, the position of the physical gate door (gate door position) may be a mere passage point, and in this case, the position of the physical gate door may be different from or the same as the logically set "leaving line." For example, in actual operation, the "gate door position" and the "leaving line" may be set to be the same.

For example, in the case of gate 10 that charges a passing person, the "leaving line" may correspond to a "charging line."

For example, when a person who has entered gate 10 passes the charging line (for example, when the person enters zone C from zone B), the person is charged. In other words, at a stage where the person has not passed the charging line (for example, a stage where the person does not enter zone C), the person is not charged. By providing this charging line, it is possible to avoid an error of charging a person who has entered gate 10 but has returned before passing the charging line.

In the above description, an example in which the "charging line" corresponds to the "Z line" (the "leaving line") has been described, but for example, the "charging line" may correspond to the "B line."

Note that, in the above example, an example in which three zones are defined except for the northern outer-zone area and the southern outer-zone area has been described, but the present disclosure is not limited thereto. The number, size, position, and shape of the zones may vary depending on the situation to which the present disclosure applies.

For example, face authentication functional unit 12 according to the present embodiment executes the first-stage face authentication process when the person enters above-described zone A, and executes the second-stage face authentication process when the person enters zone B from zone A. By performing the authentication process in two stages, it is possible to confirm by the second-stage face authentication process whether or not the person authenticated in the first stage has passed through gate 10. Hereinafter, the two-stage face authentication process will be described.

Figure 4:
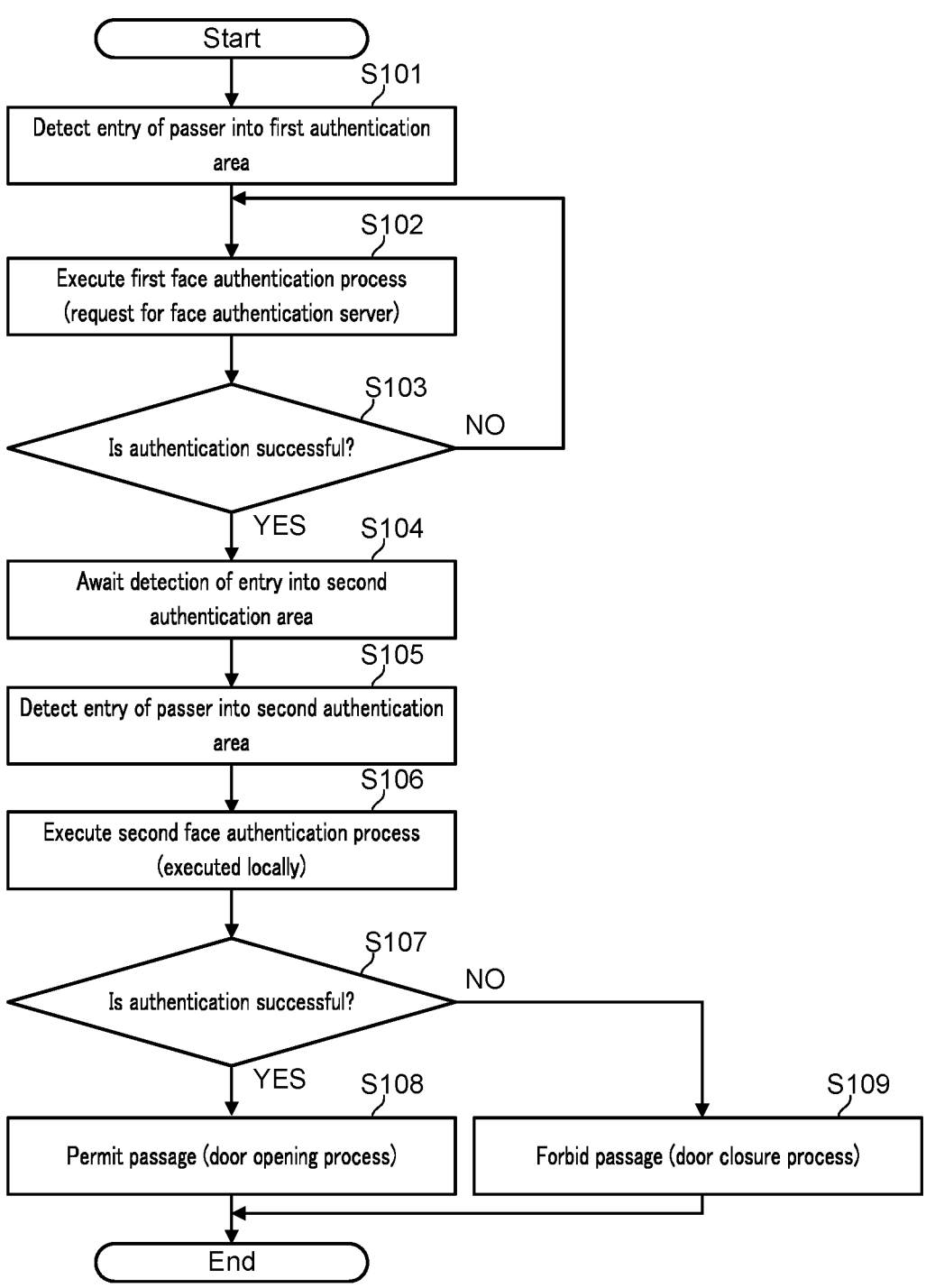
FIG. 4 is a flowchart illustrating an outline of a two-stage face authentication process.

FIG. 4 is a flowchart illustrating an outline of the two-stage face authentication process. The process illustrated in FIG. 4 may be started, for example, every time a passer approaches.

Face authentication processor 12 detects an approach of a passer to gate 10 and entry of the passer into a first authentication area (for example, zone A) (S101). Note that the first authentication area is not limited to zone A illustrated in FIGS. 3A and 3B. The first authentication area may be, for example, an area on the upstream side of the charging line of gate 10 in which a face frame having such a size as to allow the face authentication process can be acquired in the captured image. In addition, whether or not the passer has entered the first authentication area may be determined by, for example, a sensor (for example, a photoelectric sensor) disposed in gate 10.

Face authentication functional unit 12 performs the first face authentication process on the passer who has entered the first authentication area (S102). For example, face authentication functional unit 12 transmits the face authentication request including information on a face frame in an image captured by camera 11 to face authentication server 14. When receiving the face authentication request, face authentication server 14 determines whether or not the passer is among registrants, for example, based on the information on the face frame. When a result of the determination indicates that the passer is among the registrants, face authentication server 14 transmits, for example, information indicating the corresponding registrant to face authentication functional unit 12. On the other hand, when the passer is not among the registrants, face authentication server 14 transmits information indicating the result of the determination to face authentication functional unit 12.

Face authentication functional unit 12 determines whether or not authentication is successful as a result of the first face authentication process (S103).

When the authentication fails (NO in S103), face authentication functional unit 12 executes the process of S102 again. Here, the case where the authentication fails is, for example, a case where the passer is not included in the registrants held in face authentication server 14. When the passer is not included in the registrants held in face authentication server 14, the passer may be treated as a person who is not permitted to pass through gate 10. Alternatively, the case where the authentication fails may be a case where it is erroneously determined in the face authentication process that the passer is not an identical person to a corresponding one of the registrants even though the passer is included in the registrants.

When the authentication is successful (YES in S103), the passer waits until the entry of the passer into the second authentication area (Zone B) is detected (S104). Note that the second authentication area is not limited to zone B illustrated in FIGS. 3A and 3B. For example, the second authentication area may be an area disposed beyond the charging line in gate 10.

Face authentication processor 12 detects that the passer has entered the second authentication area (S105). Whether or not the passer has entered the second authentication area may be determined by, for example, a sensor such as a photoelectric sensor.

Face authentication functional unit 12 performs a second face authentication process on the passer who has entered the second authentication area (S106). For example, instead of performing a face authentication process request for the second face authentication process of face authentication server 14, face authentication functional unit 12 may execute the second face authentication process locally by gate 10 itself (or face authentication functional unit 12 itself).

Face authentication functional unit 12 determines whether or not the result of the second face authentication process is successful authentication (S107).

When the authentication fails (NO in S107), face authentication functional unit 12 determines, for example, that passage by the passer is not permitted (S109). In this case, a process of closing the door of gate 10 (door closure process) is executed. When the authentication fails (NO in S107), the first face authentication process similar to that in S103 may be performed again (re-authentication or re-collation) prior to determining that the passage by the passer is not permitted. Here, as in S103, face authentication functional unit 12 transmits the face authentication request to face authentication server 14, but the information included in the face authentication request may be the information on the face frame in the image in S107. Then, the process illustrated in FIG. 4 ends.

When the authentication is successful (YES in S107), face authentication functional unit 12 determines that the passage of the passer through gate 10 may be permitted (S108). In response to this determination, face authentication functional unit 12 may, for example, instruct gate 10 to open a door that restricts passage of gate 10. Then, the process illustrated in FIG. 4 ends.

By this two-stage face authentication process as described above, it is possible to confirm by the second-stage face authentication process whether or not the person having been successful in authentication in the first stage has passed through gate 10.

When the face authentication process is performed in two stages, there are a plurality of systems with different methods and/or timings of the second-stage face authentication process. For example, as described below, there are a multiplex local authentication system, a local face authentication tracking system, and a late batch system.

In the multiplex local authentication system, the information acquired from the face authentication server in the first-stage face authentication process is registered in a local face authentication engine, and the registered information is used in the face authentication processes in the second and subsequent stages.

For example, in the multiplex local authentication system, when a face collation result is received from face authentication server 14, the face collation result including information on a feature amount of a face of a candidate is received. Then, the information on the feature amount of the face of the candidate is registered in the local face authentication engine. In the face authentication process performed after the information is registered in the local face authentication engine, the degree of coincidence indicating whether or not the passer and the candidate are the same person is confirmed using the image of the passer captured and the registered information. Note that, in the multiplex local authentication system, the information on the feature amount of the face of the candidate does not necessarily have to be included in the face collation result. Face authentication functional unit 12 may receive the information on the feature amount of the face of the candidate as information different from the face collation result, or at different timings between the face collation result and the information on the feature amount of the face of the candidate. That is, in the case where the image information on the first face image region successfully matches the information on the registrant as a result of collation in face authentication server 14, a data structure and/or the timing of the received information are not limited as long as face authentication functional unit 12 can receive the feature amount of the face of the candidate corresponding to the registrant.

In the multiplex local authentication system, since the face authentication process is performed a plurality of times, it is possible to improve the authenticity of the passer as a person permitted to pass through gate 10. Here, in the multiplex local authentication system, the face authentication processes in the second and subsequent stages are performed using the feature amount registered in face authentication server 14. Thus, the face authentication processes in the second and subsequent stages are also performed with the same accuracy as the face authentication process using face authentication server 14. Therefore, it is possible to more reliably confirm that the passer is a person permitted to pass through gate 10.

In the local face authentication tracking system, information about a passer included in an image used in the first face authentication process is registered in a local face authentication engine, and the registered information is used in the face authentication processes in the second and subsequent stages.

For example, in the local face authentication tracking system, face registration of a passer is performed on the local face authentication engine at a timing at which a face authentication request is transmitted to face authentication server 14. Here, the face registration of the passer may correspond to extracting an area of the face of the passer from an image of the passer captured, and registering information on an image (i.e., a face image) of the extracted area, or may correspond to registering a feature amount obtained from the extracted face image. In the face authentication process performed after the information is registered in the local face authentication engine, face collation (1:1 face collation) between an image of the passer captured and the registered face image is executed, and it is confirmed that the image-captured passer and the registered passer are the same person. Then, when the size of a face frame and an image-capturing region in the image of the passer captured are equal to or larger than the designated size and are enclosed within a specified area, and further when a collation result from face authentication server 14 indicates OK, passage by the passer is permitted.

With the local face authentication tracking system, in the authentication processes in the second and subsequent stages, it is possible to track entry into and passage through gate 10 by the passer who has succeeded in being authenticated as a person permitted in the first face authentication process to pass through gate 10. Thus, the passage through gate 10 can be guaranteed. Further, in the local face authentication tracking system, the feature amount used in the first face authentication process is used in the second and subsequent authentication processes. It is thus possible to perform authentication reflecting the latest environment (for example, illumination, exposure to the sun) and the like in the second and subsequent authentication processes. Accordingly, even when there is a deviation between the face image registered in face authentication server 14 and the latest face image (for example, the face region in the image captured by camera 11) due to an influence of the shadow in the vicinity of gate 10, the aging, and the like, the passage management can be appropriately performed.

In the late batch system, like the above-described local face authentication tracking system, the information about the passer included in the image used in the first face authentication process is registered in the local face authentication engine, and the registered information is used in the face authentication processes in the second and subsequent stages. However, unlike the local face authentication tracking system, the late batch system does not execute the face authentication processes in the second and subsequent stages in real time. For example, the face authentication processes in the second and subsequent stages are executed collectively at a certain timing. The certain timing may be a time period (for example, at night) in which a small number of persons pass through gate 10, or a timing such as the end of a month.

In the late batch system, since real-time performance is not pursued, it is possible to suppress waste of computer resources (for example, processing capabilities of CPU) related to the face authentication process in a control apparatus, servers, and the like.

Note that the examples of the two-stage authentication system are not limited to the above examples. In the above examples, the authentication in the second and subsequent stages is performed by the local face authentication engine instead of transmitting the face authentication request to face authentication server 14, but the present disclosure is not limited thereto. For example, the face authentication request may be transmitted to the face authentication server also in the second stage, and it may be determined in face authentication server 14 whether or not there is a candidate who is the same person as the passer.

Although FIG. 4 illustrates the example in which the timing in which authentication is performed in the two-stage authentication method is when the photoelectric sensor detects that a passer has entered a certain area, the present disclosure is not limited to this.

For example, camera 11 captures an image of a person entering from the entrance of gate 10 in a direction from the exit of gate 10 toward the entrance. Accordingly, the face frame of the person present in the area (for example, zone B in FIG. 3A) in which the second-stage face authentication is performed is larger than the face frame of the person present in the area (for example, zone A in FIG. 3A) in which the first-stage face authentication is performed.

By utilizing the difference in size of the face frame between the area where the first-stage face authentication is performed and the area where the second-stage face authentication is performed, the timing at which the authentication is performed may be specified based on the size of the face frame instead of the photoelectric sensor. Hereinafter, an example of the two-stage face authentication process based on the size of the face frame will be described.

Figure 5:
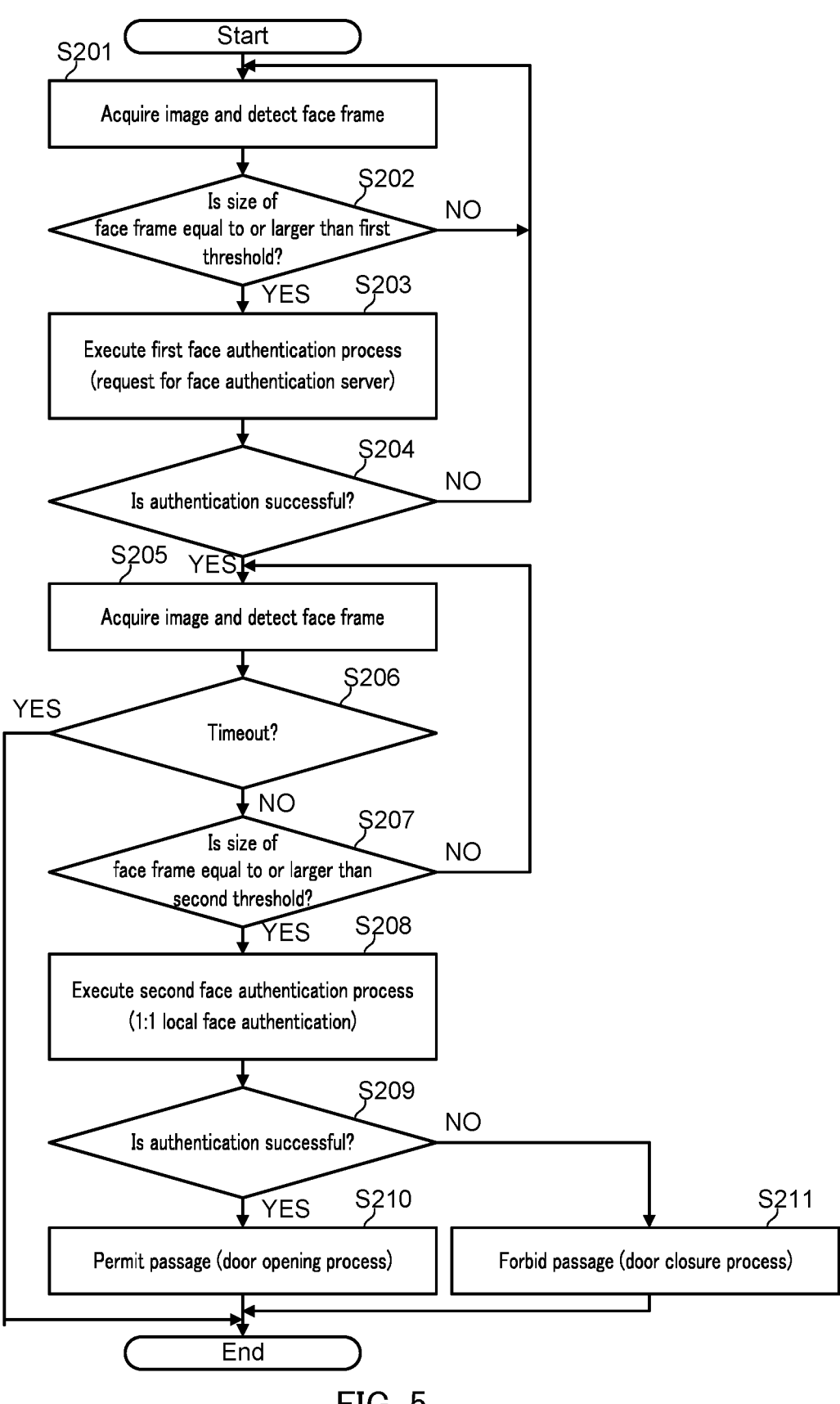
FIG. 5 is a flowchart illustrating a first example of the two-stage face authentication process.

FIG. 5 is a flowchart illustrating a first example of the two-stage face authentication process. The process illustrated in FIG. 5 may be started, for example, every time a passer approaches.

Face authentication functional unit 12 acquires an image and detects a face frame (S201).

Face authentication functional unit 12 determines whether or not the size of the face frame is larger than or equal to a predetermined first threshold (S202). The size of the face frame and the first threshold compared with the size of the face frame may be defined by the area in the image region, or may be defined by the length of the face frame in the vertical direction or the length of the face frame in the horizontal direction. Further, the first threshold may be defined based on, for example, a lower limit or an upper limit of the size of the face frame used in the face authentication process in S203 described later.

When the size of the face frame is not equal to or larger than the first threshold (NO in S202), face authentication functional unit 12 executes the process of S201.

When the size of the face frame is equal to or larger than the first threshold (YES in S202), face authentication functional unit 12 performs the first face authentication process on the detected face frame (S203). In the first face authentication process, the face authentication request is transmitted to face authentication server 14, and face authentication server 14 determines whether or not there is a candidate among the registrants who is the same person as the passer.

Face authentication functional unit 12 determines whether or not the result of the first face authentication process is successful authentication (S204). Authentication failures and successes may be similar to those in S104 of FIG. 4.

When the authentication fails (NO in S204), face authentication functional unit 12 executes the process of S201.

When the authentication is successful (YES in S204), face authentication functional unit 12 acquires an image at the next timing and detects a face frame (S205).

Face authentication functional unit 12 determines whether or not a timeout has occurred (S206). For example, in the process of S206, it is determined that a timer is activated at a timing when the authentication is successful in the first face authentication process in S203, and an occurrence of the timeout is determined when the time indicated by the timer at or after a predetermined time. Here, the time indicated by the timer is the time starting from the timing at which the first face authentication process in S203 succeeds in the authentication to the timing execution of the determination of S206. Further, for example, the predetermined time may be an upper limit time allowed for passage through gate 10 of a passer who succeeds in authentication in the first face authentication process. This timeout determination makes it possible, for example, to execute an appropriate process (for example, to warn a passer) in a situation in which the passer who has succeeded in the authentication in the first stage stays in the path of gate 10.

When the timeout occurs (YES in S206), the process ends.

When no timeout occurs (NO in S206), face authentication functional unit 12 determines whether or not the size of the face frame is larger than or equal to a predetermined second threshold (S207). For example, the second threshold is greater than the first threshold. For example, the second threshold may be the lower limit or the upper limit of the size of the face frame used in the face authentication process in S208 described later. Alternatively, the second threshold may be defined by the size of the face frame of the captured image of the person who has an average face size and has reached the charging line. In addition, the second threshold may be defined by a value resulting from multiplication, by a factor greater than 1, of the size of the face frame to be processed in S203.

When the size of the face frame is not equal to or larger than the second threshold (NO in S207), face authentication functional unit 12 executes the process of S205.

When the size of the face frame is equal to or larger than the second threshold (YES in S207), face authentication functional unit 12 executes the 1:1 face authentication process, which is the second face authentication process, on the face frame detected in S205 (S208).

For example, in the second face authentication process of the multiplex local authentication system, the information on the feature amount of the face of the candidate acquired in S203 and the information on the face frame of the passer detected in S205 are collated, and it is determined whether or not the candidate and the passer are the same person.

Further, for example, in the second face authentication process of the local face authentication tracking system, the information on the face frame on which the first face authentication process is executed in S203 is collated with the information on the face frame of the passer detected in S205, and it is determined whether the candidate and the passer are the same person.

Face authentication functional unit 12 determines whether or not the result of the second face authentication process is successful authentication (S209).

When the authentication fails (NO in S209), face authentication functional unit 12 treats the passer such that passage by the passer is not permitted (S211). In this case, the process of closing the door of gate 10 (door closure process)

is executed. When the authentication fails (NO in S209), the first face authentication process similar to that in S203 may be performed again (re-authentication or re-collation) prior to treating the passer such that passage by the passer is not permitted. Here, as in S203, face authentication functional unit 12 transmits the face authentication request to face authentication server 14. The face authentication request may include information about the face frame in the image in S208. Then, the process ends.

Here, the case where the authentication fails may be, for example, a case where the information on the candidate specified in the first face authentication process in S203 does not coincide with the information on the image of the passer captured. The case where the pieces of information do not match each other may be, for example, a case where a score obtained by the face authentication process is lower than a threshold allowing determination of the same person. The case where the information on the specified candidate and the information on the image of the passer captured do not coincide with each other may be a case where the specified candidate and the passer included in the image are not the same person (for example, a case where the passer is changed in the course of passage). Alternatively, the case where the information on the specified candidate and the information on the image of the passer captured do not match may be a case where the specified candidate and the passer included in the image are erroneously determined not to be the same person although the specified candidate and the passer included in the image are the same person.

When the authentication is successful (YES in S209), face authentication functional unit 12 may determine to permit the passage by the passer through gate 10 (S210). In response to this determination, face authentication functional unit 12 may output, for example, to gate 10, an instruction to open a door that restricts passage through gate 10. Then, the process ends.

Although FIG. 5 illustrates the example in which the second-stage face authentication process is executed locally, the present disclosure is not limited to this. For example, as illustrated below with reference to FIG. 6, face authentication server 14 may be requested to perform face authentication in the second-stage face authentication process. It is thus possible to omit the function of performing face authentication from gate 10, so as to simplify the configuration of gate 10.

Figure 6:
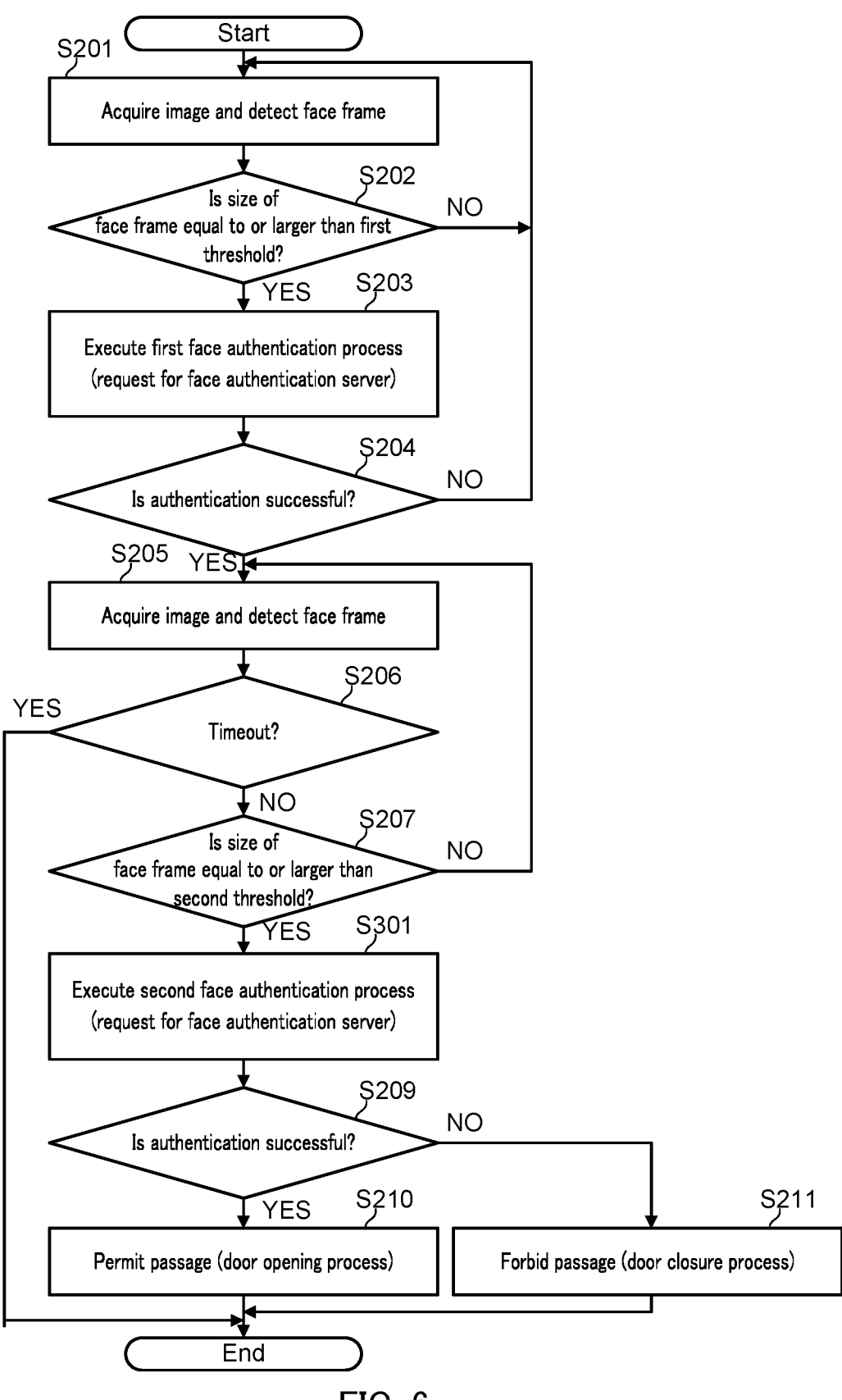
FIG. 6 is a flowchart illustrating a second example of the two-stage face authentication process.

FIG. 6 is a flowchart illustrating a second example of the two-stage face authentication process. The process illustrated in FIG. 6 may be started, for example, every time a passer approaches. In FIG. 6, processes similar to the processes illustrated in FIG. 5 are denoted by the same reference numerals, and description thereof will be omitted. In FIG. 6, S208 in FIG. 5 is replaced with S301.

When the size of the face frame is equal to or greater than the second size (YES in S207), face authentication functional unit 12 executes the second face authentication process for the face frame detected in S205 (S301). Here, in S301, face authentication functional unit 12 transmits a face authentication request to face authentication server 14. The face authentication request includes, for example, the face frame detected in S205. In addition, in face authentication server 14, it may be determined whether or not a candidate person the same as the passer is present in the registrants. Alternatively, face authentication server 14 may perform a process simplified using the result of collation performed based on the face authentication request in S203. For example, the information on registrants narrowed down by the result of collation executed based on the face authentication request in S203 may be collated with the information on the face frame included in the newly received face authentication request.

As described above, in passage management system 1 of the present embodiment, the first face authentication process is executed based on the face frame in the captured image of the person who is present in the first authentication area, and, for the person successful in the first face authentication process, the second face authentication process is executed based on the face frame in the captured image of the person who is present in the second authentication area between the first authentication area and the exit of the gate. By the two-stage face authentication process executed by this configuration, it is possible to realize, with a simple configuration, the passage management of an object (for example, a person) passing through the gate.

Note that, the above-described embodiment has been described in relation to the example in which the two-stage face authentication process is performed, but the present disclosure is not limited to this, and three or more stages of face authentication process may be performed. For example, with respect to a person who succeeds in the first-stage face authentication process, detection of a face frame and face authentication process may be performed on each image captured after the first-stage face authentication process, and the person may be tracked. In this case, the face authentication processes in the second and subsequent stages may be executed locally. With this configuration, it is possible to sequentially follow movements of the person, and it is possible to accurately determine whether or not the person has passed through gate 10. For example, in the configuration in which the person is followed, the face authentication process may be stopped and the tracking may be ended when a sensor disposed at the exit of gate 10 (or at the charging line of gate 10) detects the passage by the person.

In the first-stage face authentication process, the accuracy of face authentication (face collation) is ensured. Accordingly, the second-stage face authentication process may be simplified. For example, the number of feature amounts of the face used in the second-stage face authentication process may be smaller than the number of feature amounts of the face used in the first-stage face authentication process. For example, in a case where respective feature amounts of parts of the face are used in the first-stage face authentication process, the feature amounts of the eyes of the face may be used while the feature amounts of the parts other than the eyes do not have to be used in the second-stage face authentication process. As a result, the processing load related to comparison of the feature amounts can be reduced, and the processing speed in the second stage can increase.

Further, for example, in the face authentication process, a score calculated by comparing feature amounts of two faces (for example, a face of a registrant and a face of a passer) is compared with a threshold, and when it is to be determined that the two faces are of the same person when the score is equal to or larger than the threshold, the threshold may be adjusted in accordance with the stage of the face authentication process. The threshold used in the second-stage face authentication process may be smaller than the threshold used in the first-stage face authentication process. By adjusting the thresholds, the processing load related to the comparison of the score can be reduced, and the processing speed in the second stage can increase.

Note that, the above present embodiment has been described in relation to the example in which the door closure process is performed when the authentication fails in the second-stage face authentication process, but the present disclosure is not limited to this. For example, in the second-stage face authentication process, when the authentication fails, the door closure process does not have to be performed depending on the installation state and/or the congestion state of gate 10. For example, in the case of a gate disposed at a railway station, a large number of persons passes through the gate. Therefore, when the flow of the persons is stopped by the door closure process, congestion occurs. In such a case, detecting a person who unauthentically passes through the gate is not prioritized, and in order not to stop the flow of the persons, the door closure process does not need to be performed.

Further, in the present embodiment described above, whether or not the person has entered the first area and/or the second area is determined based on whether or not the size of the face frame is equal to or larger than the first threshold and/or the second threshold, but the present disclosure is not limited thereto. A rate of change in the size of the face frame obtained based on the size of the face frame may be used to determine whether a person has entered the first area and/or the second area. The rate of change in the size of the face frame represents a rate of change in the size of the face frame in the image that changes with the passage of time (or the movement of the person). For example, the rate of change in the size of the face frame at certain time point t is calculated by comparing the size of the face frame acquired at time point t with the size of the face frame that is of the same person as time point t and that is acquired earlier by one time point (or by a plurality of time points) than time point t. In general, since the rate of change in the size of the face frame increases as the face approaches the camera, the rate of change in the size of the face frame changes according to the distance between the person and the camera. In addition, since the rate of change in the size of the face frame indicates the ratio of change (or the change amount), it is less likely to be affected by the difference in the size of the face for each person. Therefore, by determining whether or not the rate of change in the size of the face frame is equal to or greater than a predetermined threshold, it is possible to determine the approach of the face (for example, to which area the person has entered) while absorbing the difference in the size of the face for each person.

Further, in the present embodiment described above, it is determined using the information on the face frame whether or not the person has entered the first area and/or the second area, but the present disclosure is not limited thereto. Based on the distance between facial parts, it may be determined whether or not the person has entered the first area and/or the second area. In general, the distance between the facial parts in the captured image increases as the face approaches the camera. It is thus possible to determine the approach of the face by determining whether or not the distance between the parts of the face such as the distance between the eyes and the distance between the eyes and the mouth is equal to or greater than a predetermined threshold. Examples of the facial parts include facial organs such as eyes, nose, mouth, ears, etc. However, features different from the general organs, such as stains, moles, wrinkles, etc., may be used as facial parts. Instead of the distance between the parts, the size of the facial parts in the captured image may be used. This is because, like the size of the face frame, the sizes of the facial parts also increase as the face approaches the camera. Also, in place of the distance between the parts, the rate of change in the sizes of the facial parts may be used. This is because, like the rate of change in the size of the face frame, the rate of change in the sizes of the facial parts also increases as the face approaches the camera.

In determining which area the person who is going to pass through gate 10 has entered, the above-described methods may be used in combination or selectively, or the same method may always be used.

Further, in the present embodiment described above, the success or failure of each of the first-stage face authentication process and the second-stage face authentication process may be outputted by a sound and/or image. At this time, sounds and/or images different between the success/failure of the first-stage face authentication process and the success/failure of the face authentication processes in the second and subsequent stages may be output. It is thus possible to make the person who intends to pass through gate 10 aware that two or more stages of authentication are being performed. In addition, when a face authentication process on the person fails, it is possible to indicate the stage of the failure while distinguishing between the stage of obtaining permission to pass through gate 10 (success or failure of the first-stage face authentication process) and the stage of checking the passage through gate 10 (success or failure of the face authentication processes in the second and subsequent stages).

Further, for example, at a gate disposed at a railway station and configured to manage entry and leaving of a user of the railway to and from the station premises, the user is not charged when entering the station premises, but is charged when leaving the station. Therefore, when the user of the railway passes through the gate and enters the station premises, the face authentication process may be simplified. For example, when the authentication of the user who enters fails, the information on the image which fails in the authentication is recorded, and when the user leaves, the information on the image recorded during the entry is used to specify the entered location, and the user is charged accordingly.

The above-described embodiment has been described in relation to the system for managing passage of a person passing through gate 10, but the present disclosure is not limited to this. For example, the present disclosure may be applied to a case where a side wall of a path and a restriction portion (for example, a door) that restricts passage of the person are not provided. For example, the present disclosure may be applied as long as the path is a moving path from one zone to another zone for which an entry of a person is permitted in accordance with an authentication process. In this case, a camera that captures the face of the person passing through the moving path may be installed, for example, in a support portion or the like disposed on the moving path.

Further, the present embodiment has been described in relation to an example in which an authentication target is a person, but the present disclosure is not limited to this. For example, the present disclosure may be applied to a moving object such as an animal or a vehicle. Further, the present embodiment has been described in relation to an example in which face authentication is performed, but the present disclosure is not limited to this. For example, the present disclosure may be applied to other authentication methods such as authentication using an ID card indicating that a user has the right to pass through a gate, and biometric authentication.

In addition, the face authentication and another authentication method may be used in combination. Even when passage is not permitted by the face authentication of the disclosed embodiment described above, passage may be exceptionally permitted by inputting information of an ID card.

Further, in the above-described embodiment, cameras 11 are not limited to the example in which the cameras are installed on side walls V of gate 10. For example, cameras 11 may be attached to a support portion disposed at gate 10. The support portion may be, for example, a pole extending in a vertical direction from gate 10, or may be an arcuate member disposed over the side walls of gate 10.

Further, in the above-described embodiment, the door is used as a means for restricting the passage through gate 10, but the passage may be directly or indirectly restricted by other means. For example, an alarm may be sounded or a warning light may be turned on to indicate to a person attempting to pass through gate 10 that the passage through gate 10 is restricted. In addition, a notification may be sent to a terminal or the like owned by an employee in the vicinity of gate 10 to restrict the employee from passing through the gate.

In addition, depending on a congestion situation, whether or not to perform control to prevent passage or a means for restricting passage may be switched. For example, in an environment in which blockage or restriction of passage by a person can deteriorate safety, such as when a large number of persons enter or leave, the passage through gate 10 may not be blocked, and information indicating that an illegal passage has occurred may be recorded. In this case, the face image or the face authentication result of a person who has performed unauthorized passage may be recorded in association with the information indicating that the unauthorized passage has occurred. It is thus possible to later track the person who has made the unauthorized passage, and to request payment for the right of passage or the like.

In addition, in the above-described embodiment, passage management system 1 manages both entrance to a facility and leaving the facility at an entrance/exit of the facility such as an airport, station, and event hall, but 1 of the entry to the facility and leaving the facility at the entrance or the exit may be managed, and the other does not have to be managed.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IOT)."

In recent years, in Internet of Things (IOT) technology, Cyber Physical Systems (CPSs), which are a new concept of creating new added value by information cooperation between a physical space and cyberspace, has attracted attention. This CPS concept can also be adopted in the above embodiment.

That is, a basic configuration of the CPSs is, for example, such that an edge server disposed in the physical space and a cloud server disposed in the cyberspace can be connected to each other via a network, and processes can be distributedly processed by processors mounted in these servers. Here, it is preferable that pieces of processed data generated in the edge server or the cloud server be generated on a standardized platform. By using such a standardized platform, it is possible to efficiently build a system including various sensor groups and IoT application software.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Moreover, any combination of features of the above-mentioned embodiments may be made without departing from the spirit of the present disclosure.

While examples of the present disclosure have been described in detail above, those examples are mere examples and do not limit the scope of the appended claims. The techniques disclosed in the scope of the appended claims include various modifications and variations of the concrete examples exemplified above.

The disclosure of Japanese Patent Application No. 2021-069724, filed on Apr. 16, 2021, including the specification, drawings and abstract, is incorporated herein by reference in its entirety.

INDUSTRIAL APPLICABILITY

One exemplary embodiment of the present disclosure is suitable for a face authentication system.

REFERENCE SIGNS LIST

1 Passage management system
10 Gate
11 Camera
12 Face authentication functional unit
121 Camera controller
122 First face collation processor
123 Second face collation processor
13 Passage management functional unit
131 Passage management state transition processor
132 History manager
133 History DB
14 Face authentication server
15 Passage history management server

The invention claimed is:
1. An information processing apparatus, comprising:
a processor configured to receive an image of a person entering a gate, the image being captured by a camera in a direction from an exit of the gate toward an entrance of the gate and including a face image region, wherein
the processor performs a second face authentication process on the person who has been successful in a first face authentication process, the first face authentication process being based on a first face image region in a first image captured in a first area defined for the gate, the second face authentication process being based on a second face image region in a second image captured in a second area defined between the first area and the exit of the gate, the second area being closer to the camera than the first area; and
an output processor that produces an output to an effect that the person has passed through the gate, when it is determined by the second face authentication process that the person who has been successful in the first face authentication process and the person included in the second image are an identical person, wherein
the processor
determines that the person has entered the first area, when a rate of change in a size of the first face image region is equal to or greater than a first threshold, and
determines that the person has entered the second area, when a rate of change in a size of the second face image region is equal to or greater than a second threshold greater than the first threshold.
2. The information processing apparatus according to claim 1, wherein the processor transmits image information on the first face image region to a server in the first face authentication process, the server having information on a registrant permitted to pass through the gate, receives, from the server, a collation result of collation between the image information on the first face image region and the information on the registrant, determines based on the collation result whether or not the first face authentication process is successful, receives information on a candidate corresponding to the registrant from the server when the collation between the image information on the first face image region and the information on the registrant is successful in the server, and collates the information on the candidate and image information on the second face image region in the second face authentication process.

3. The information processing apparatus according to claim 1, wherein the processor collates the image information on the first face image region with the image information on the second face image region in the second face authentication process.

4. The information processing apparatus according to claim 1, wherein the processor performs the second face authentication process after the person has passed through the gate.

5. The information processing apparatus according to claim 1, wherein the processor performs the second face authentication process using a feature amount smaller in number than a feature amount of a face used in the first face authentication process.

6. The information processing apparatus according to claim 1, wherein the processor uses a threshold for face collation in the second face authentication process, the threshold being smaller than a threshold compared with a collation score of face collation in the first face authentication process.

7. The information processing apparatus according to claim 1, wherein the information processing apparatus outputs a sound or an image different between a case where the first face authentication process is successful and a case where the second face authentication process is successful.

8. An information processing method, comprising steps performed by an information processing apparatus for:

receiving an image of a person entering a gate, the image being captured by a camera in a direction from an exit of the gate toward an entrance of the gate and including a face image region;

performing a second face authentication process on the person who has been successful in a first face authentication process, the first face authentication process being based on a first face image region in a first image captured in a first area defined for the gate, the second face authentication process being based on a second face image region in a second image captured in a second area defined between the first area and the exit of the gate, the second area being closer to the camera than the first area;

and producing an output to an effect that the person has passed through the gate, when it is determined by the second face authentication process that the person who has been successful in the first face authentication process and the person included in the second image are an identical person, wherein determining that the person has entered the first area, when a rate of change in a size of the first face image region is equal to or greater than a first threshold, and determining that the person has entered the second area, when a rate of change in a size of the second face image region is equal to or greater than a second threshold greater than the first threshold.

* * * * *